(12) United States Patent
Hara et al.

(10) Patent No.: US 6,530,013 B1
(45) Date of Patent: Mar. 4, 2003

(54) INSTRUCTION CONTROL APPARATUS FOR LOADING PLURALITY OF INSTRUCTIONS INTO EXECUTION STAGE

(75) Inventors: Michiharu Hara, Kawasaki (JP); Aiichiro Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/461,422

(22) Filed: Dec. 16, 1999

(30) Foreign Application Priority Data

Dec. 17, 1998 (JP) .......................................... 10-359281

(51) Int. Cl.$^7$ .............................................. G06F 9/312
(52) U.S. Cl. ...................................... 712/206; 712/204
(58) Field of Search ........................ 712/24, 200, 204, 712/206, 207; 711/125, 201

(56) References Cited

U.S. PATENT DOCUMENTS

| | | | | |
|---|---|---|---|---|
| 5,371,864 A | * | 12/1994 | Chuang ....................... | 712/206 |
| 5,581,718 A | * | 12/1996 | Grochowski ................ | 712/206 |
| 5,845,100 A | * | 12/1998 | Gupta et al. ................ | 712/204 |
| 5,852,727 A | * | 12/1998 | Narayan et al. ............ | 712/215 |
| 5,941,980 A | * | 8/1999 | Shang et al. ................ | 712/204 |
| 6,292,845 B1 | * | 9/2001 | Fleck et al. ................. | 712/206 |
| 6,321,325 B1 | * | 11/2001 | Tremblay et al. ........... | 712/204 |
| 6,463,520 B1 | * | 10/2002 | Otani et al. ................. | 712/205 |

FOREIGN PATENT DOCUMENTS

| | | |
|---|---|---|
| JP | 60-117335 | 6/1985 |
| JP | 3-255530 | 11/1991 |
| JP | 5-313888 | 11/1993 |
| JP | 6-89173 | 3/1994 |

* cited by examiner

Primary Examiner—William M. Treat
(74) Attorney, Agent, or Firm—Staas & Halsey LLP

(57) ABSTRACT

In an instruction control apparatus that enables a plurality of instructions of different instruction lengths to be selected simultaneously from an instruction buffer, the amount of circuitry is reduced while achieving high speed processing. The instruction control apparatus includes a selection circuit and a pointer that points to the beginning of the next instruction word, within the instruction sequence fetched in a holding means, to be loaded into an execution stage. The selection circuit first selects a portion of the instruction sequence, starting from the beginning pointed to by the pointer and extending until reaching a maximum length of instructions that can be loaded into the execution stage, then simultaneously examines the lengths of instructions contained in the selected portion on the basis of a minimum instruction length unit, and selects the plurality of instructions to be loaded into the execution stage, based on the combination of the instruction lengths. One or more instructions thus selected are held in a plurality of loading ports.

3 Claims, 6 Drawing Sheets

(A)
DECODER 1

| SELECTION SIGNAL | A |
|---|---|
| a | 2 |
| b | 4 |
| c | 6 |

(B)
DECODER 2

| SELECTION SIGNAL | A | B | C |
|---|---|---|---|
| d | 2 | 2 | — |
| e | 2 | 4 | — |
| — | 2 | 6 | — |
| e | 4 | — | 2 |
| f | 4 | — | 4 |
| — | 4 | — | 6 |
| e | 6 | — | — |

Fig.6
(A)
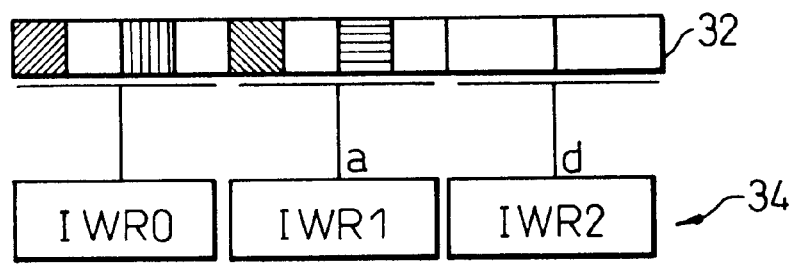
(B)
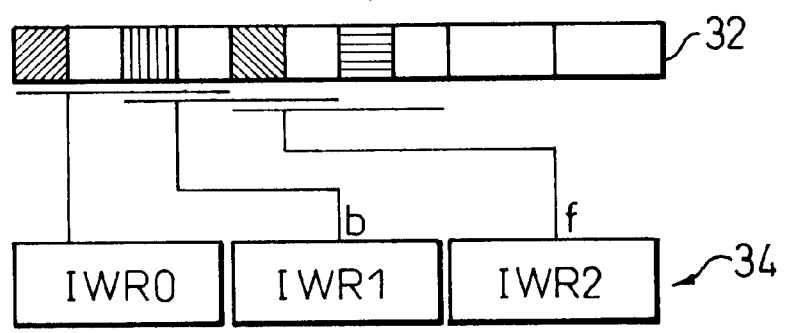
(C)
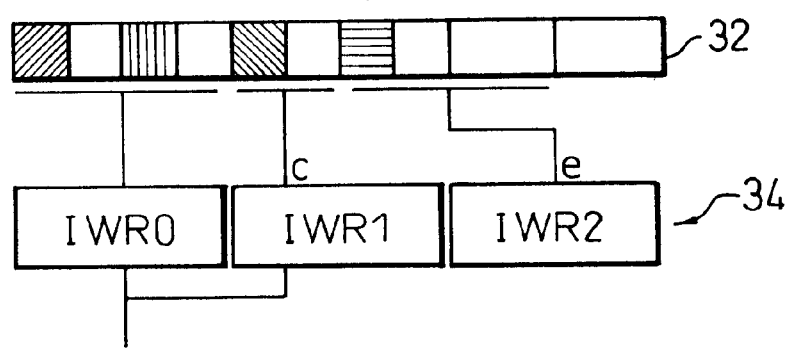

Fig.7

DECODER 3

| VALUE TO BE ADDED TO NSIC | TOTAL LENGTH OF INSTRUCTIONS LOADED INTO EXECUTION STAGE | A | B | C | D | E |
|---|---|---|---|---|---|---|
| 3 | 6 | 2 | 2 | 2 | — | — |
| 4 | 8 | 2 | 2 | 4 | — | — |
| 2 | 4 | 2 | 2 | 6 | — | — |
| 4 | 8 | 2 | 4 | — | 2 | — |
| 5 | 10 | 2 | 4 | — | 4 | — |
| 3 | 6 | 2 | 4 | — | 6 | — |
| 1 | 2 | 2 | 6 | — | — | — |
| 4 | 8 | 4 | — | 2 | 2 | — |
| 5 | 10 | 4 | — | 2 | 4 | — |
| 3 | 6 | 4 | — | 2 | 6 | — |
| 5 | 10 | 4 | — | 4 | — | 2 |
| 6 | 12 | 4 | — | 4 | — | 4 |
| 4 | 8 | 4 | — | 4 | — | 6 |
| 2 | 4 | 4 | — | 6 | — | — |
| 4 | 8 | 6 | — | — | 2 | — |
| 5 | 10 | 6 | — | — | 4 | — |
| 3 | 6 | 6 | — | — | 6 | — |

INSTRUCTION CONTROL APPARATUS FOR LOADING PLURALITY OF INSTRUCTIONS INTO EXECUTION STAGE

BACKGROUND OF THE INVENTION

1. Field of the Invention

The present invention relates to an information processing-apparatus that has an instruction set comprising variable length instructions, and that executes a plurality of instructions concurrently, and more particularly to an instruction processing unit for loading a plurality of instructions into an execution stage.

2. Description of the Related Art

It is known to provide an information processing apparatus that executes a plurality of instructions concurrently (refer to Japanese Unexamined Patent Publication Nos. 6-89173 and 3-255530). In this information processing unit for concurrent execution of a plurality of instructions, as an execution stage is freed, the next sequence of instructions is loaded simultaneously into the execution stage to start the execution of the instructions.

As for the instruction word length, variable instruction length may be employed, depending on the logic specification used. When dealing with such instructions differing in word length, selecting instructions to be loaded into the execution stage requires first interpreting the first instruction, only after which the starting location of the next instruction can be determined. This makes it difficult to execute a plurality of instructions concurrently.

Furthermore, with increasing speed of the system cycle in recent years, there has been an increasing need to enable instructions to be selected at high speed while reducing the amount of circuitry involved.

SUMMARY OF THE INVENTION

An object of the present invention is to provide an instruction control apparatus that enables a plurality of instructions of different instruction lengths to be selected simultaneously from an instruction buffer.

Another object of the invention is to reduce the amount of circuitry and achieve high speed processing in an instruction control apparatus that enables a plurality of instructions of different instruction lengths to be selected simultaneously from an instruction buffer.

The present invention has been devised to achieve the above objects. The instruction control apparatus of the invention comprises: address unit holding an address from which to fetch an instruction word, and for updating the address; storage unit holding the fetched instruction word; a fetch control circuit which, prior to instruction execution in an execution stage, fetches one or more instruction words into the storage unit in accordance with the address indicated by the address unit; and a selection circuit which selects a plurality of instructions to be loaded into the execution stage. The selection circuit first selects a portion of an instruction sequence fetched in the storage unit, starting from the beginning of the next instruction word to be loaded into the execution stage, pointed to by a pointer, and extending until reaching a maximum length of instructions that can be loaded into the execution stage, and then, from within the selected portion, selects the plurality of instructions to be loaded into the execution stage, based on a minimum instruction length unit and on the length of each of the instructions.

According to the present invention, since the selection circuit performs the selection in two stages, a plurality of instructions can be selected simultaneously and be executed concurrently in the execution stage.

The instruction control unit of the present invention may be provided with a plurality of loading ports ports for holding the instructions selected by the selection circuit. Each of the plurality of loading ports has a length shorter than the maximum instruction length of instructions to be held therein, and when the length of the instruction to be loaded is longer than the length of the loading port length, the instruction is divided and held between the plurality of loading ports. By using a plurality of such small loading ports, each port is reduced in size, and the selection circuit is also reduced in size. Furthermore, by limiting the execution stage that performs a long instruction word, the circuitry of the execution stage can be reduced.

Further, in the present invention, the instruction word is fetched, not from the starting address of the instruction sequence, but from a designated byte boundary, and a portion of the starting address of the instruction sequence is set so that the initial value of the pointer shows an offset from the designated byte boundary to the instruction sequence, and so that the pointer can point to the beginning of the instruction sequence. According to this embodiment, the need for instruction fetch data alignment can be eliminated.

BRIEF DESCRIPTION OF THE DRAWINGS

The above object and features of the present invention will be more apparent from the following description of the preferred embodiment with reference to the accompanying drawings, wherein:

FIGS. 5(A) and 5(B) are diagrams showing the contents of first and second decoders in FIG. 4;

FIGS. 6(A) to (C) are diagrams showing the relationship between the instruction length of each instruction and the instruction loaded into each loading port according to the decoders of FIGS. 5(A) and (B); and FIG. 7 is a diagram showing the contents of a third decoder in FIG. 4.

DESCRIPTION OF THE PREFERRED EMBODIMENTS

An embodiment of the present invention will be described below with reference to the accompanying drawings. The description hereinafter given assumes that the minimum instruction length is a half word (two bytes) and instructions having instruction lengths equal to integral multiples of half word (i.e., two bytes, four bytes, and six bytes) are supported. In each instruction, the value of the first two bits indicates the instruction length. It is also assumed that the CPU can load three instructions at a time into an execution stage in the case of two-byte or four-byte instructions, and only one or two instructions at a time in the case of six-byte instructions.

Figure 1:
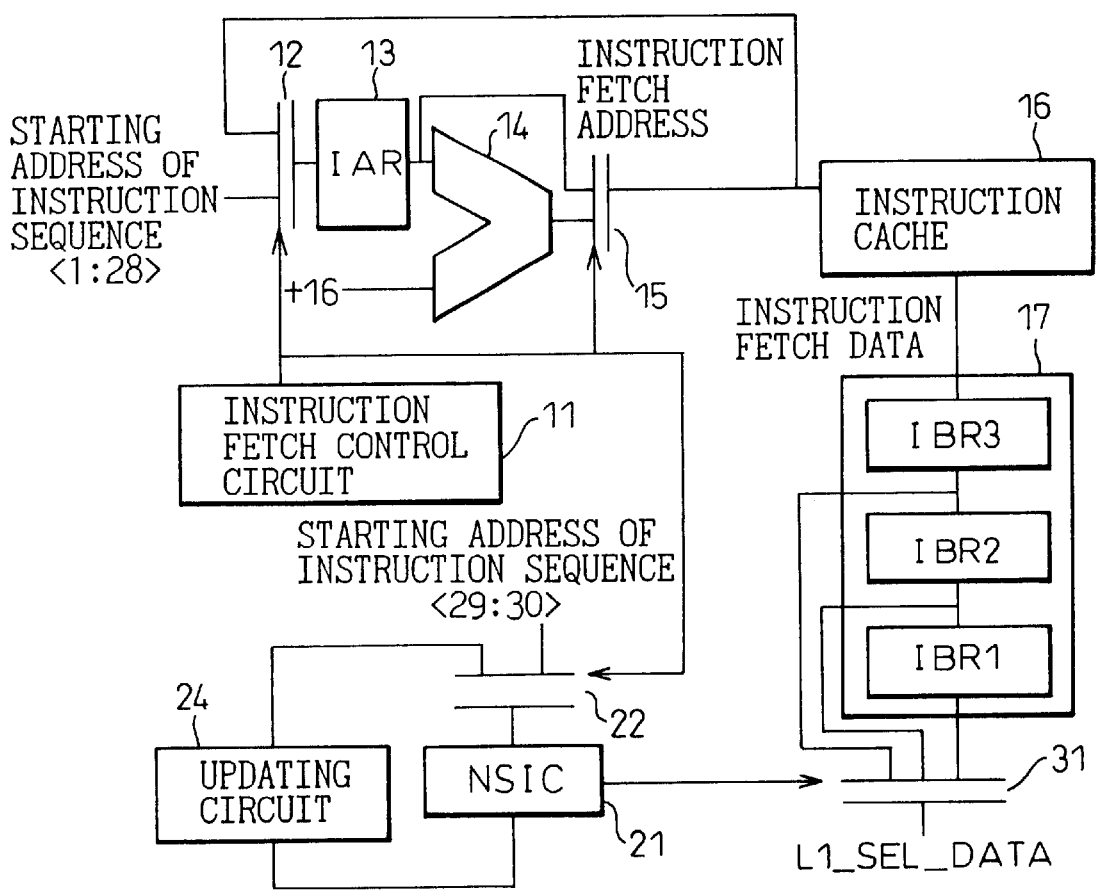
FIG. 1 is a diagram showing the circuit configuration (part 1) of an instruction control unit according to an embodiment of the present invention.
Figure 2:
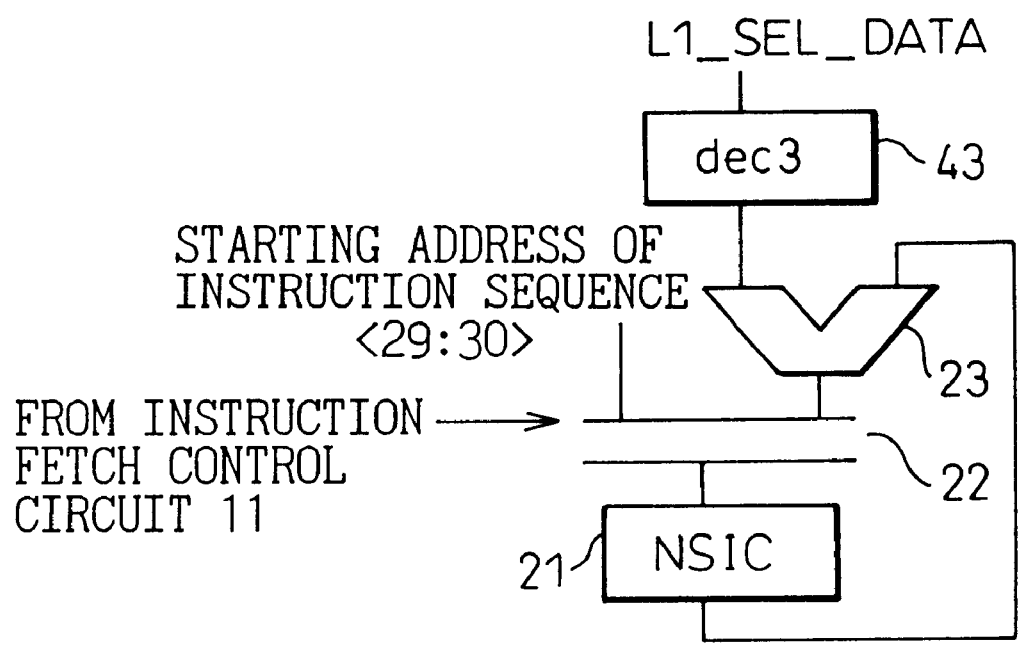
FIG. 2 is a diagram showing the circuit configuration (part 2) of the instruction control unit according to the embodiment of the present invention.
Figure 3:
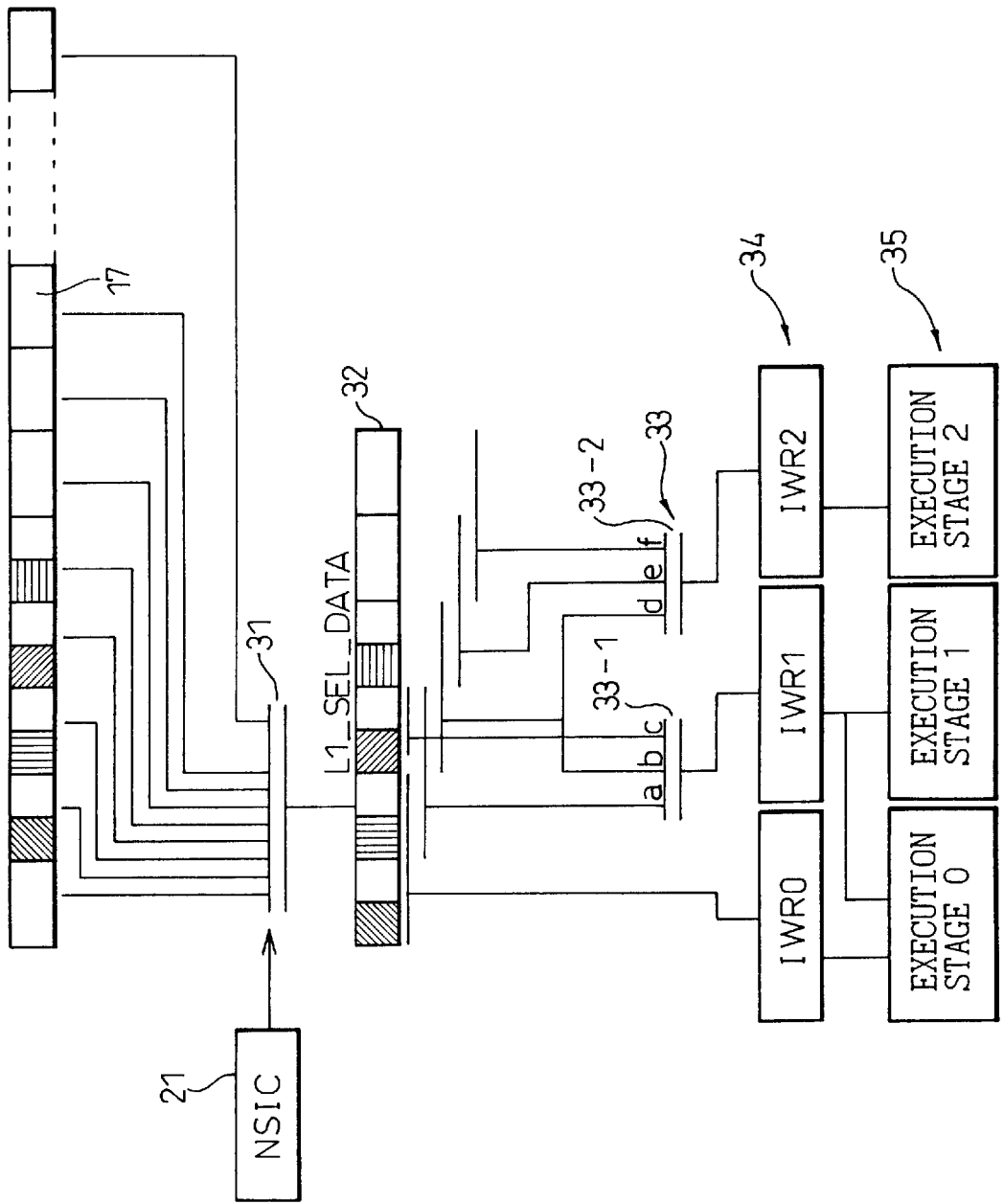
FIG. 3 is a diagram showing the circuit configuration (part 3) of the instruction control unit according to the embodiment of the present invention.

FIGS. 1, 2, and 3 show the circuit configuration of an instruction control unit. In this instruction control unit, the instruction address is represented by 31 bits from bit 1 to bit 31. FIG. 1 shows the circuit configuration from the portion where data is fetched from an instruction cache into an instruction buffer to the portion where the starting location of an instruction to be loaded into the execution stage is pointed to by a pointer. FIG. 2 shows the detailed configuration of the pointer 21. FIG. 3 shows the circuit configuration up to the portion where the instructions held in the instruction buffer 17 are loaded into the execution stage.

In FIG. 1, when the CPU is set into an operating state, and when a request for an instruction fetch for the first instruction sequence is made or when a request for an instruction fetch for the next instruction sequence is made by a branch instruction, etc., an instruction fetch control circuit 11 switches an extraction circuit 12 to the "STARTING ADDRESS OF INSTRUCTION SEQUENCE" side and an extraction circuit 15 to the "INSTRUCTION ADDRESS REGISTER 13" side. The instruction address specified by bits 1 to 28 in the starting address of the instruction sequence is loaded into the instruction address register 13 (IAR). Using. this address, instructions are fetched from the instruction cache register 16 into the instruction buffer register 17. The value of the instruction address register 13 is used when fetching the second and subsequent instructions.

The amount of data fetched at a time into the instruction buffer register 17 (IBR) is 16 bytes on an eight byte boundary. The instruction buffer register 17 consists of three stages of registers, IBR3, IBR2, and IBR1 so that a plurality of fetched instructions can be held. The data fetched from the instruction cache register 16 is first loaded into the IBR3.

When the next request is issued, the instruction fetch control circuit 11 switches the extraction circuit 12 to the "INSTRUCTION ADDRESS" side and the extraction circuit 15 to the "ADDER 14" side. The adder 14 adds +16 to the last instruction fetch address held in the instruction address register 13, and the result is set as the next instruction fetch address. With this address, the next 16-byte data following the last 16-byte data is despatched from the instruction cache register 16. The data in the IBR 3 is shifted forward into the IBR2. With each request, the data in IBR3 and IBR2 are shifted forward into IBR2 and IBR1, respectively.

The pointer 21 (NSIC) is provided to point to a location in the instruction buffer 17 in half-word increments. An instruction word is loaded into the execution stage in accordance with the location pointed to by the pointer 21. The location in the instruction buffer 17 is represented by a value of H '08' when it is the beginning of the IBR1, from which the value is incremented by 1 for each half word, taking a value of H '10' at the beginning of the IBR2 and a value of H '18' at the beginning of the IBR3; when the IBR is empty, the value is H '20' which indicates that the instruction buffer is empty.

The details of the NSIC 21 and an updating circuit 24 are shown in FIG. 2. When the CPU is set into an operating state, and when a request for an instruction fetch for the first instruction sequence is made or when a request for an instruction fetch for the next instruction sequence is made by a branch instruction, etc., the instruction fetch control circuit 11 switches an extraction circuit 22 to the "STARTING ADDRESS OF INSTRUCTION SEQUENCE" side. The pointer 21 is a 6-bit pointer. As the initial value of the pointer 21, B '0' is set in bit 0, B '11' in bits 1 and 2, and B '0' in bit 3. Bits 29 and 30 in the starting address of the instruction sequence are set in bits 4 and 5. Bits 29 and 30 in the starting address of the instruction sequence show an offset value to the instruction sequence within a designated byte boundary. By setting this value as the initial value of the pointer 21, the pointer 21 points to the first instruction specified by the starting address of the instruction sequence within the fetch data fetched on an eight byte boundary.

With the above value set as the initial value of the pointer 21, the pointer 21 points to the first instruction specified by PSW within the instruction sequence fetched on an eight byte boundary. This serves to simplify the circuit configuration since the need for instruction fetch data alignment can be eliminated.

For the second and subsequent instructions, the instruction fetch control circuit 11 switches the extraction circuit 22 to the "ADDER 23" side. The adder 23 adds up the lengths of the instructions in accordance with an output from a decoder 43 as the instructions are loaded into the execution stage described hereinafter. The operation of the decoder 43 will be described later. Though not shown here, −8 is added for each shift operation from the IBR3 to the IBR2 and from IBR2 to IBR1.

FIG. 3 shows the entire configuration of the circuit from the portion where a plurality of instructions are selected simultaneously from the instruction buffer register 17 by two stages of selection circuits to the portion where the instructions are loaded into the execution stage 35.

In selecting the instructions from the instruction buffer register 17, as the first stage of selection, the selection circuit 31 selects data of 12 bytes which is the maximum length that can be loaded into the execution stage. More specifically, the selection circuit 31 selects the 12-byte data 32 (L1_SEL_DATE) starting from the starting location pointed to by the pointer 21. In FIG. 3, the data 32 is shown only as an image, and this does not mean that a register for holding the data 32 is provided.

As the second stage of selection, the selection circuit 33 selects from the data 32 a maximum of three instructions to be loaded into the execution stage 35, and supplies them to a loading port 34 for holding therein. The loading port 34 comprises three registers IWR0, IWR1, and IWR3. Each register has a 4-byte length, which is shorter than the maximum instruction length of six bytes.

The first four bytes of the data 32 are loaded directly into the IWR0 without passing through the selection circuit. The instruction selected by the selection circuit 33-1 is loaded into the IWR1, while the instruction selected by the selection circuit 33-2 is loaded into the IWR2. Selection signals a, b, and c and selection signals d, e, and f are applied to the selection circuits 33-1 and 33-2, respectively. The starting location and the data length of each of the selection signals a to f are as shown in the figure. The selection circuit 33 selects appropriate signals from the selection signals a to f in accordance with signals generated by the decoders hereinafter described.

Figures 4, 5:
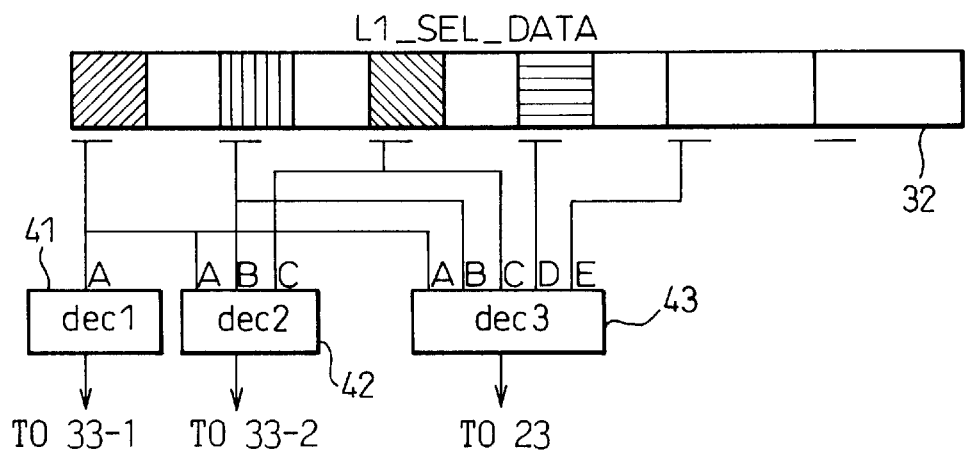
FIG. 4 is a diagram showing a circuit for obtaining the starting location of an instruction and an update value of a pointer from the data shown in FIG. 3.

FIG. 4 shows the circuit for obtaining the starting location of each instruction from the data 32 and, at the same time, an update value of the pointer 21.

Three decoders 41, 42, and 43 simultaneously decode the first two bits from every half word position (byte 0, 2, 4, 6, and 8), the minimum instruction length, in the selected 12-byte data 32, and examine the instruction length of each instruction. Based on combinations of the instruction lengths, the decoders 41 and 42 create the selection signals for the second selection circuit 33 to apply to the loading port 43 to select a maximum of three instructions from within the 12-byte data (the CPU in this example can load three 4-byte instructions at a time). At the same time, the decoder 43 obtains the update value of the pointer 21 from the combination of the instruction lengths.

FIGS. 5(A) and 5(B) show the contents of the decoders 41 and 42. The first two bits of the data 32 are input as input signal A to the first decoder 41. The input signal A indicates an instruction length of either two bytes, or four bytes, or six bytes. The decoder 41 outputs one of the selection signals a to c according to the byte length.

The first two bits of the data 32, the first two bits of the second byte from the head of the data 32, and the first two bits of the fourth byte from the head of the data 32 are input as input signal A, input signal B, and input signal C to the second decoder 42. The decoder 42 outputs one of the selection signals d to f in accordance with the byte lengths (instruction lengths) indicated by the respective input signals A, B, and C. In the figure, symbol (–) in the selection signal column indicates no output signal, and (–) in the input signal A–C column means that the corresponding signal is ignored.

FIGS. 6(A) to 6(C) show representative examples of the relationship between the instruction length of each instruction contained in the data 32 and the instruction loaded into each IWR of the loading port 34.

Part (A) shows the case where the data 32 is made up of three 4-byte instructions. In this case, the selection signals b and f are selected, and the 4-byte instructions are held in the IWRs 0, 1, and 2, respectively.

Part (B) shows the case where the first three instructions in the data 32 are two bytes long each. In this case, the selection signals a and d are selected, and the first three 2-byte instructions are held in the IWRs 0, 1, and 2, respectively.

Other examples of 2-byte or 4-byte instructions are not shown here. If a 6-byte instruction word is contained in the instruction sequence in a location other than the location of the first instruction in the data 32, instruction words before the 6-byte instruction word are selected and loaded into the execution stage 35. In this case, for the next instruction loading operation, the pointer 21 is set to point to the 6-byte instruction word as the first instruction word in accordance with the pointer operation described later.

Part (C) shows the case where the first instruction in the data 32 is six bytes long and the next instruction is two or four bytes long. In this case, the selection signals c and e are selected; as a result, the first four bytes of the 6-byte instruction are held in the IWR0 and the remaining two bytes in the IWR1. The next instruction is held in the IWR2.

With this operation, since only the IWR0 is configured to handle a 6-byte instruction in the execution stage, if the instruction length to be loaded into the IWR0 is 6 bytes, the IWR0 and IWR1 are concatenated to hold the 6-byte instruction for loading into the execution stage 35.

In the present embodiment, if the instruction length of one instruction is six bytes, only one instruction can be loaded at a time into the execution stage. Generally, the frequency of use of instruction words of such long length is low, or high execution speed is not usually required for such long instructions. Accordingly, reducing the amount of circuitry is more advantageous.

When the instructions are loaded from the loading port 34 into the execution stage 35, the value of the pointer 21 is updated to point to the starting location of the 12-byte data to be fetched next from the instruction buffer 17. The value of the pointer 21 is updated by the adder 23 adding the value from the decoder 43 to the last value of the pointer 21, as shown in FIG. 2.

The decoder 43 obtains the input signals A to E from the first two bits from every half word position (byte 0, 2, 4, 6, and 8), the minimum instruction length, in the selected 12-byte data 32, as shown in FIG. 4. Based on these signals, the decoder calculates the value to be added to the pointer 21.

FIG. 7 shows the relationship between the input signals A to E to the decoder 43 and the value to be added to the pointer 21. Since the NSIC points to the half word position (2 bytes), the value to be added to the NSIC is given by the total instruction length divided by 2.

As earlier noted, a 6-byte instruction is not loaded into the execution stage unless the 6-byte instruction is contained in the starting location of the data 32. In the next instruction loading cycle, the 6-byte instruction is specified as the instruction in the starting location of the data 32.

As shown in FIG. 2, when no data shift occurs in the IBR, the value to be added, shown in FIG. 7, is directly used as the update value of the pointer 21 and added to the value of the pointer 21. When there is a data shift in the instruction buffer 17, –8 is taken as the update value of the pointer 21 and added to the value of the pointer 21.

According to the instruction control mechanism of the invention, a plurality of instructions of different instruction lengths can be selected simultaneously from the instruction buffer. In the instruction control mechanism for executing such simultaneous selection according to the invention, the circuitry of the selection circuit, loading port, and execution stage can be reduced in size and high speed selection of instructions can also be achieved while reducing the amount of circuitry involved.

What is claimed is:

1. An instruction control apparatus comprising:

address unit holding an address from which to fetch an instruction word, and for updating said address;

storage unit holding said fetched instruction word;

a fetch control circuit, prior to instruction execution in an execution stage, fetching one or more instruction words into said storage unit in accordance with the address indicated by said address unit;

a selection circuit selecting a portion of an instruction sequence held in said storage unit, starting from the beginning of the next instruction word to be loaded into said execution stage, pointed to by a pointer, and extending until reaching a maximum length of instructions that can be loaded into said execution stage, and which, from within said selected portion, selects a plurality of instructions to be loaded into said execution stage, based on a minimum instruction length unit and on the length of each of said instructions; and a plurality of loading ports holding the instructions selected by said selection circuit.

2. The instruction control apparatus according to claim 1, wherein each of said plurality of loading ports has a length shorter than the maximum instruction length of instructions to be held therein, and when the length of the instruction to be loaded is longer than the length of said loading port length, said instruction is divided and held between said plurality of loading ports.

3. The instruction control apparatus according to claim 1, wherein said address unit fetches said instruction word, not from the starting address of said instruction sequence, but from a designated byte boundary, and sets a portion of the starting address of said instruction sequence so that the initial value of said pointer shows an offset from said designated byte boundary to said instruction sequence, and so that said pointer points to the beginning of said instruction sequence.

* * * * *